(12) United States Patent
Otaki et al.

(10) Patent No.: US 6,199,002 B1
(45) Date of Patent: Mar. 6, 2001

(54) CONTROL METHOD AND APPARATUS USING CONTROL GAIN VARIABLE WITH ESTIMATED OPERATION OF CONTROL OBJECT

(75) Inventors: Tetsuya Otaki, Kariya; Kenichi Maki, Ichinomiya; Masaya Oi, Okazaki; Koji Nagata, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/198,393

(22) Filed: Nov. 24, 1998

(30) Foreign Application Priority Data

Jan. 14, 1998 (JP) .................................................. 10-005970
Aug. 6, 1998 (JP) .................................................. 10-223133

(51) Int. Cl.⁷ ..................................................... G06F 17/00
(52) U.S. Cl. ............................................... 701/51; 700/45
(58) Field of Search ................................. 701/58, 60, 61; 477/34, 52, 68; 700/77, 282, 28, 44, 45; 318/592, 611, 617

(56) References Cited

U.S. PATENT DOCUMENTS

| | | | |
|---|---|---|---|
| 4,054,780 | * 10/1977 | Bartley et al. | 364/150 |
| 4,694,390 | * 9/1987 | Lee | 364/165 |
| 4,725,969 | 2/1988 | Onogi et al. | |
| 5,219,391 | * 6/1993 | Edelen et al. | 74/335 |
| 5,392,215 | 2/1995 | Morita | |
| 5,909,370 | * 6/1999 | Lynch | 364/148.05 |

FOREIGN PATENT DOCUMENTS

| | | |
|---|---|---|
| 60-268607 | 12/1985 | (JP) . |
| 63-41636 | * 2/1988 | (JP) . |
| 63-277492 | 11/1988 | (JP) . |
| 3-227734 | 10/1991 | (JP) . |
| 5-127701 | * 5/1993 | (JP) . |

* cited by examiner

*Primary Examiner*—Michael J. Zanelli
(74) *Attorney, Agent, or Firm*—Nixon & Vanderhye, P.C.

(57) ABSTRACT

A control method and apparatus which detects a solenoid current as a voltage, and PWM-controls a transistor for a solenoid such that the detection voltage becomes a target voltage. A feedback gain, used for setting PWM signal output time, is set in accordance with the difference between the detection voltage and the target voltage such that the greater the difference becomes, the greater the feedback gain becomes. Further, a detection voltage after a predetermined period is estimated based on the change of detection voltage from the past. If the estimation value overshoots the target voltage, a difference B between the detection voltage and the target voltage and a difference C between the detection voltage and the estimation value are obtained, and the feedback gain is varied by multiplying the feedback gain by the ratio B/C between the these differences.

19 Claims, 6 Drawing Sheets

CONTROL METHOD AND APPARATUS USING CONTROL GAIN VARIABLE WITH ESTIMATED OPERATION OF CONTROL OBJECT

CROSS REFERENCE TO RELATED APPLICATION

This application is based on and incorporates herein by reference Japanese Patent Applications No. 10-5970 and No. 10-223133 filed on Jan. 14, 1998 and Aug. 6, 1998, respectively.

BACKGROUND OF THE INVENTION

1. Field of the Invention

The present invention relates to a control apparatus and method which detects operation status of a control object and feedback-controls the control object such that the operation status becomes as desired.

2. Description of Related Art

A conventional control apparatus detects an operation status of a control object by using a sensor or the like, calculates a control amount for controlling the control object by using the difference between the detected actual operation status and desired status and a predetermined control gain (i.e., feedback gain), and feedback-controls the control object by the calculated control amount.

In this control apparatus, when the difference between the actual operation status of the control object and the desired status is large, the control object can be quickly changed toward the desired status by increasing the control gain. This improves the control response. However, when the actual operation status is close to the desired status, overshoot or undershoot (collectively referred to as overshoot) that the actual operation status exceeds the desired status occurs. It takes a significant amount of time to converge the operation status to the desired status. On the other hand, if the control gain is reduced, the overshoot problem can be prevented, to improve the control stability. However, the control response is lowered.

To overcome those problems, for example, in a constant-speed running apparatus which feedback-controls the running speed of a vehicle to a target speed, a running resistance (i.e., external load on a control object) is determined from an acceleration or the like of the vehicle as the control object, and a control gain is varied with the determined running resistance to prevent overshoot (U.S. Pat. No. 5,392,215 and JP-A 6-64461). At the beginning of overshoot, the control gain is changed to improve the control convergence after the occurrence of overshoot (JP-A 3-22734). Overshoot is prevented by setting the control gain in accordance with the vehicle acceleration upon start of control (U.S. Pat. No. 4,725,969 and JP-A 60-71341).

Further, other controls than those in the constant-speed running device have been proposed. For example, in idle rotation control and the like to control an idle rotation speed of an internal combustion engine to a target idle rotation speed, overshoot can be prevented by setting a control gain in accordance with the difference between the desired status (target idle rotation speed) and actual operation status (actual idle rotation speed).

That is, in the conventional control apparatuses, to prevent overshoot while ensuring control response, the control gain is set based on an external load on the control object or the operation of the control object upon start of control, or based on the difference between the desired status and the actual operation status during control.

However, as these conventional apparatuses set the control gain from operation status or the like of the control object, requirements for both the improved control response and control stability cannot be sufficiently satisfied.

SUMMARY OF THE INVENTION

The present invention has an object to provide a control method and apparatus which feedback-control a control object to a desired status and more reliably prevents occurrence of overshoot while ensuring control response.

To attain the above object, according to the present invention, an actual operation status of the control object is detected, and a control amount to control the control object to the desired status is calculated based on the difference between the detected actual operation status and the desired status and a control gain. Further, an operation status of the control object after a predetermined period is estimated based on the change of the detected actual operation status from the past to the present. It is determined whether the estimated operation status is in overshoot status that the estimated operation status exceeds the desired status from the present actual operation status. If it is determined that the estimated operation status is in the overshoot status, the control gain is varied to a value less than a normal value.

That is, when the control object is feedback-controlled in accordance with the calculated control amount, the operation status after a predetermined period is estimated from the present status of the control object. If the estimated operation status overshoots (or undershoots) the desired status, the control gain is varied to a small value.

BRIEF DESCRIPTION OF THE DRAWINGS

Other objects, features and advantages of the present invention will be apparent from the following description taken in conjunction with the accompanying drawings. In the drawings.

DETAILED DESCRIPTION OF THE PREFERRED EMBODIMENTS

Figure 1:
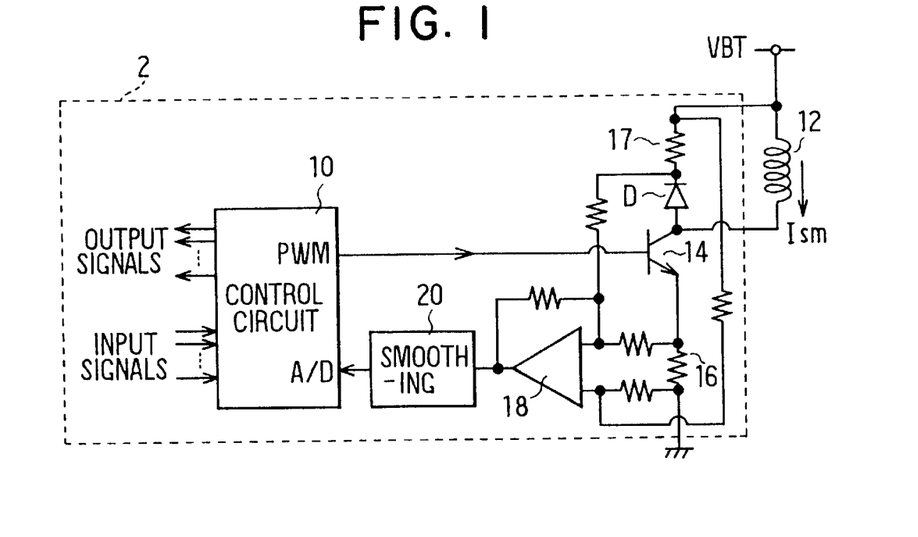
FIG. 1 is a block diagram showing a control apparatus according to an embodiment of the present invention.

Referring first to FIG. 1, an ECU (electronic control unit) 2 is a control apparatus for a vehicle automatic transmission control (AT control) to control transmission gears, lock-up and the like of an automatic transmission mounted on a vehicle. The ECU 2 has a microcomputer comprising a CPU, a ROM, a RAM and the like, as a control circuit 10 which performs various calculation processings for AT control. The control circuit 10 receives input signals from various sensors such as a vehicle speed sensor and a shift position sensor, and an engine status signal (a signal indicating rotation, throttle opening angle and the like) from an engine control device. The control circuit 10 is programmed to perform the various calculation processings for AT control based on the input signals, in accordance with a control program stored in the ROM. Based on the calculation results, it controls various actuators such as a solenoid provided in the automatic transmission.

In the present embodiment, the control circuit 10 feedback-controls a solenoid current Ism which flows through a line-pressure control solenoid 12 as an inductive load for line-pressure (hydraulic fluid pressure) control on the automatic transmission.

A battery voltage VBT is applied to one end of the solenoid 12 as a control object. The ECU 2 has a transistor 14 for switching connection/disconnection of the other end of the solenoid 12 to the ground.

The transistor 14 comprises an NPN transistor having a collector connected to the solenoid 12 and an emitter connected to the ground via a resistor 16. When the transistor 14 is turned on, the current (solenoid current) Ism flows through the solenoid 12 via the transistor 14 and the resistor 16. The resistor 16 detects the solenoid current Ism that flows at this time (i.e., when the transistor is turned on) as a voltage.

Further, the collector of the transistor 14 is connected to the anode of a diode D. The cathode of the diode D is connected to the one end of the solenoid 12 where the battery voltage VBT is applied, via a resistor 17. The diode D is used for preventing high voltage from being applied to the collector side of the transistor 14 by energy accumulated in the solenoid 12 when the transistor 14 is turned off. When the transistor 14 has been turned off, the diode continues to enable the solenoid current Ism to flow until the energy accumulated in the solenoid 12 is discharged. Further, the resistor 17 detects the solenoid current Ism that flows at this time (i.e., when the transistor 14 is turned off) as a current value.

Both terminal voltages of the resistors 16 and 17 are amplified by a differential amplifier 18 comprising an operational amplifier, further, smoothed by a smoothing circuit 20 comprising an integrator or the like, and inputted into the control circuit 10 as a current detection voltage Vsm.

Further, the control circuit 10 includes an A/D converter which A/D converts the detection voltage Vsm of the solenoid current Ism inputted from the smoothing circuit 20. The circuit 10 detects the solenoid current Ism from the input voltage value (detection voltage Vsm) via the A/D converter, and turns the transistor 14 on/off by way of pulse width modulation (PWM) such that the solenoid current Ism becomes the target current Itgt necessary for line pressure control.

Figure 2:
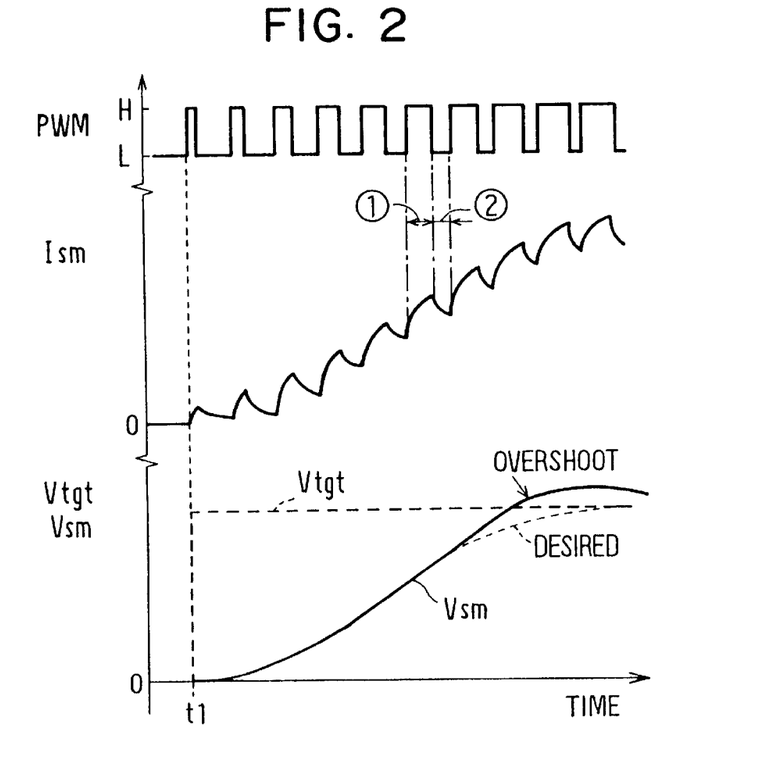
FIG. 2 is a time chart showing the basic operation of feedback control performed in the embodiment.

That is, as shown in FIG. 2, the control circuit 10 sets a target voltage Vtgt in accordance with the detection voltage vsm from the necessary target current Itgt to control the line pressure of the automatic transmission to the target fluid pressure, generates a pulse width modulation signal to control the detection voltage Vsm to the target voltage Vtgt based on the difference between the voltages Vtgt and Vsm, and outputs the PWM signal to the base of the transistor 14, so as to turn on/off the transistor 14 to control the detection voltage Vsm (i.e., the solenoid current Ism) to the target voltage Vtgt (i.e., the target current Itgt).

In FIG. 2, the area ① of the solenoid current Ism represents the solenoid current Ism detected via the resistor 16 when the PWM signal is at a High level and the transistor 14 is on; the area ② represents the solenoid current Ism detected via the resistor 17 when the PWM signal is at a Low level and the transistor 14 is off.

In this feedback control, the detection value (detection voltage Vsm) is a value obtained as a result of control, and delayed from an actual value (the current value Ism that actually flows through the solenoid 12). Further, especially in the present embodiment, as the solenoid current Ism pulsates due to the PWM control, the detection voltage Vsm is smoothed by the smoothing circuit 20 and inputted into the control circuit 10 so as to prevent pulsation of the detection voltage vsm inputted into the control circuit 10 as a detection value, which further delays the detection value.

Figure 3A:
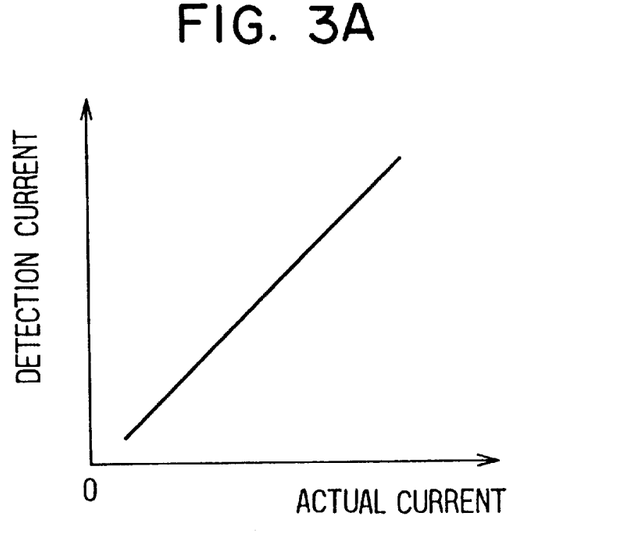
FIGS. 3A and 3B are graphs showing the operation characteristics of a solenoid used in the embodiment.
Figure 3B:
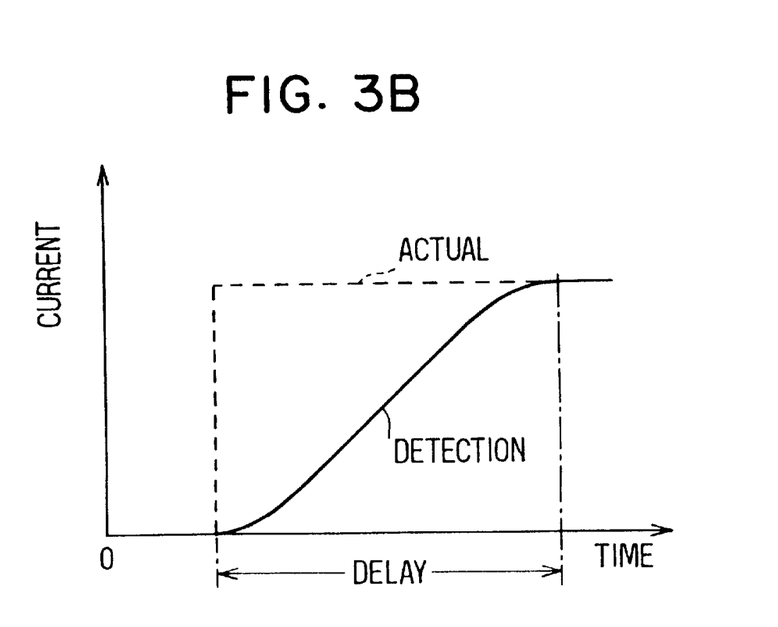

For this reason, the solenoid current (actual current) that flows through the solenoid 12 and the solenoid current (detection current) detectable by the control circuit 10 substantially correspond when the solenoid current Ism is stable around the target current Itgt, as shown in FIG. 3A. On the other hand, in the transitional period of the feedback control in which the solenoid current Ism follows the target current Itgt, the detection current and the actual current do not correspond with each other, which causes detection delay as shown in FIG. 3B.

This detection delay changes in accordance with various control conditions and is not uniquely determined. Accordingly, if the control gain (feedback gain), used for setting the duty ratio of the PWM signal as a control amount, is set only based on the difference between the detection value and the target value, overshoot caused due to the above detection delay cannot be suppressed well. As shown in FIG. 2, even after the detection voltage vsm reached the target voltage from a time point t1 at which the target voltage Vtgt was set and the feedback control was started Vtgt, the detection voltage Vsm changes due to overshoot. It takes a significant amount of time to converge the detection voltage Vsm to the target voltage Vtgt.

Accordingly, in the present embodiment, for example, it is arranged such that when the target current Itgt to flow through the solenoid 12 changes from 0 mA to 1000 mA, the solenoid current Ism reaches 90% of the target current Itgt in 40 msec (the control response is ensured). Further, to prevent overshoot that the solenoid current Ism exceeds the target current Itgt, a future detection voltage is estimated based on the change of the detection voltage Vsm from the past, and it is determined from the estimation result whether or not the detection voltage Vsm will overshoot. If it is determined that the detection voltage will overshoot, the feedback gain used for control is varied to a small value.

Figure 4A:
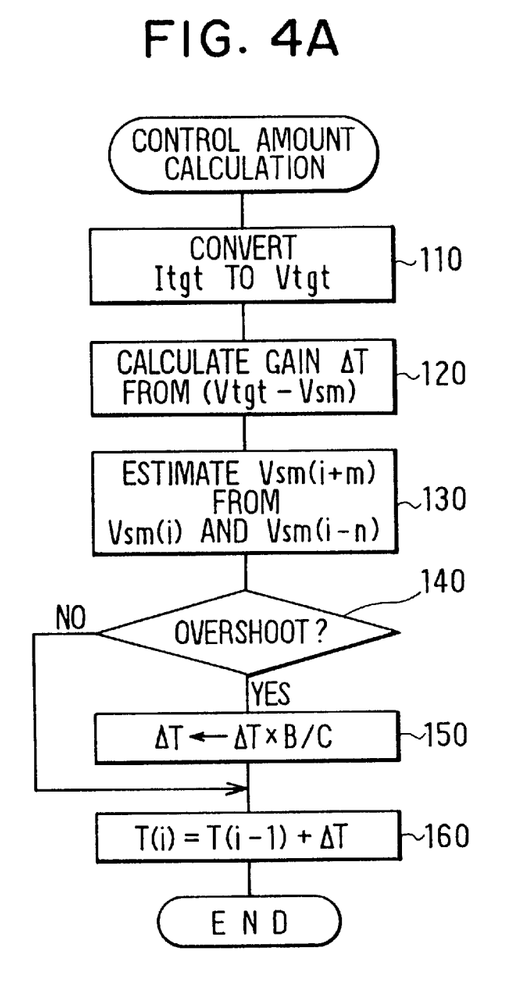
FIGS. 4A to 4C are flowcharts showing control amount calculation processing, detection processing and target current calculation processing performed in the embodiment.
Figure 4B:
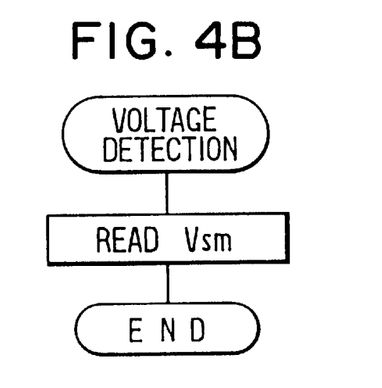
Figure 4C:
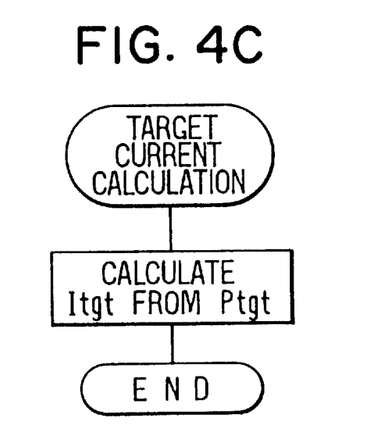

The control circuit 10 controls the line pressure of the automatic transmission to a target fluid pressure based on the control program shown in FIGS. 4A to 4C.

Figure 5:
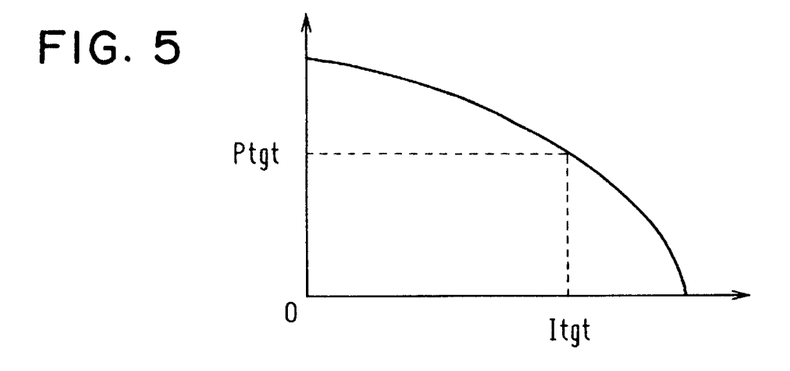
FIG. 5 is a graph showing the characteristics of a target current calculation map used upon execution of the target current calculation processing.

The control circuit 10 performs control amount calculation processing (FIG. 4A) to calculate an output period (i.e., control amount) of the PWM signal (High level) to the transistor 14 as interrupt processing at, e.g., every 5 msec. The control circuit 10 performs detection processing (FIG. 4B) to read the smoothed detection voltage Vsm, inputted from the smoothing circuit 20, via the A/D converter, as interrupt processing at, e.g., every 1 msec. Further, the control circuit 10 performs target current calculation processing (FIG. 4C) to calculate the target current Itgt to flow through the solenoid 12, by using a target current calculation map shown in FIG. 5, based on the target fluid pressure (target line pressure) Ptgt calculated by control target setting processing (not shown) for AT control, as interrupt processing at, e.g., 25 msec.

Further, in the control amount calculation processing, at step S110, target-pressure calculation processing is performed to convert the target current Itgt, corresponding to the target fluid pressure calculated by the target current calculation processing, into a voltage value (target voltage Vtgt) corresponding to the detection voltage Vsm read by the detection processing. Then, at step S120, processing as control gain setting means is performed to obtain the difference between the calculated target voltage Vtgt and the detection voltage Vsm (Vtgt −Vsm), and calculate a feedback gain ΔT for feedback control from the voltage difference.

Figure 6:
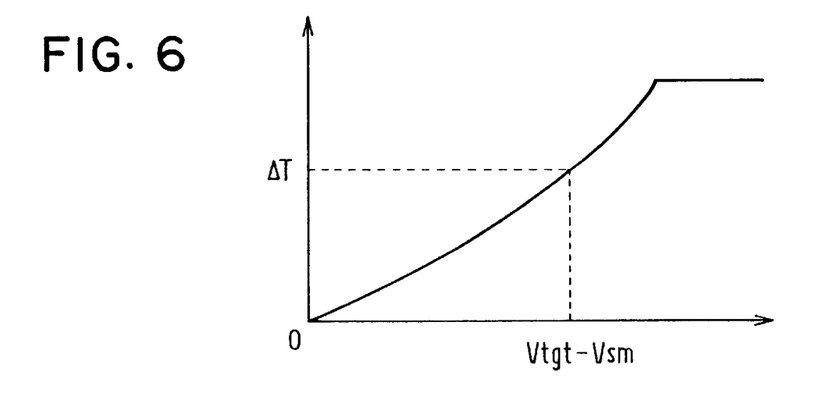
FIG. 6 is a graph showing the characteristics of a feedback gain calculation map used upon execution of the control amount calculation processing.

In the feedback gain ΔT calculation, a feedback gain calculation map having a characteristic as shown in FIG. 6 is used. The feedback gain ΔT is set by selection or correction by using the map to be smaller as the difference (Vtgt−Vsm) is smaller, and to be larger as the difference (Vtgt−Vsm) is larger. As is apparent from the map, in the present embodiment, the feedback gain Dt is set to a maximum value when the voltage difference exceeds a predetermined upper limit value.

Further, as the duty ratio of the PWM signal upon PWM control on the solenoid current is determined by adding the feedback gain ΔT to the PWM signal output period (High level time), if the target voltage Vtgt is higher than the detection voltage Vsm and the difference (Vtgt−Vsm) is a positive value, the feedback gain ΔT is set to the same positive value as the difference to increase the duty ratio of the PWM signal (i.e., the solenoid current). On the other hand, if the difference (Vtgt−Vsm) is a negative value, the feedback gain ΔT is set to the same negative value as the difference to decrease the solenoid current.

Next, when the feedback gain ΔT has been set, processing is performed to estimate a detection voltage Vsm(i+m) after a predetermined period, based on the change of detection voltage Vsm from a past detection voltage Vsm(i−n), read a predetermined period ago (more specifically, a predetermined sampling period ago) by the detection processing to a present detection voltage Vsm(i), at step S130.

The suffix "(i)" of the detection voltage Vsm indicates that the detection voltage Vsm is a latest value obtained by the detection processing. The suffix "(i−n)" indicates that the detection voltage Vsm is a value detected by detection processing n times ago. The suffix "(i+m)" indicates that the detection voltage Vsm is an estimation value estimated to be obtained when m-th voltage detection processing from the present if the present feedback control is continued.

Figure 7:
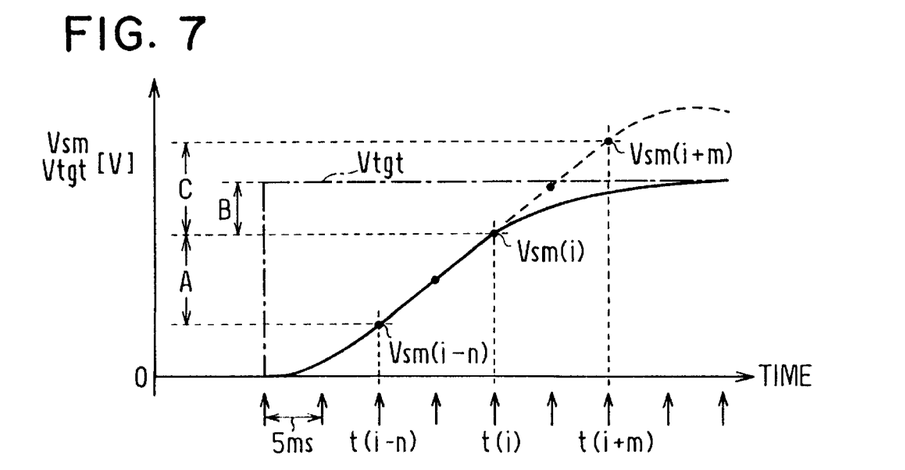
FIG. 7 is a time chart showing a procedure for estimating a future detection voltage Vsm(i+m) from a present detection voltage Vsm(i) and a past detection voltage Vsm(i−n)

In the present embodiment, for example, as shown in FIG. 7, the detection voltage Vsm(i+m) to be obtained upon m-th (m=2) detection processing (at a time point t(i+m); e.g., after 10 msec.) is estimated by adding a difference A between the detection voltage Vsm(i) at the present time point t(i) and the detection voltage vsm(i−n) obtained by the detection voltage n times ago (time point t(i−n); e.g., after 10 msec.), to the detection voltage Vsm(i).

Thus, when the estimation value Vsm(i+m) of the detection voltage vsm has been obtained, the process proceeds to step S140, at which processing is performed to determine whether or not the estimation value Vsm(i+m) exceeds the target voltage Vtgt from the present detection voltage Vsm (i) in overshoot (more specifically, overshoot or undershoot) status.

If it is determined at step S140 that the estimation value is in overshoot status, the process proceeds to step S150 at which the feedback gain ΔT is varied to a small value based on the result of determination. Then the process proceeds to step S160. The process returns and proceeds to step S160 until it is determined at step S140 that the estimation value is not in overshoot status.

In the present embodiment, as shown in FIG. 7, a difference B between the detection voltage Vsm(i) at the present time point t(i) and the target voltage vtgt (=vtgt−vsm(i)) and a difference C between the detection voltage Vsm(i) at the current time point t(i) and the estimation value Vsm(i+m) (=Vsm(i+m)−Vsm(i)) are obtained, and the feedback gain ΔT is multiplied by the ratio B/C between these differences B and C, so as to correct the feedback gain ΔT to a value smaller than a normal value.

At step S160, processing is performed to obtain the PWM signal output time T(i) by adding the above feedback gain ΔT to the PWM signal output time T(i−1) obtained by previous processing, and store the obtained time T(i) as a control amount for line pressure control. Then, the processing temporarily ends.

A timer for the PWM signal output is set to the output time T(i) in synchronization with the output period (e.g., 3 msec.) of the PWM signal. The timer outputs a signal which is at a High level during the set output time T(i). As a result, the transistor 14 is turned on/off in accordance with the PWM signal periodically outputted from the timer, to control the solenoid current Ism to the target current Itgt.

In the present embodiment, as the operation status of the solenoid 12 as the control object, the detection voltage Vsm converted from the solenoid current Ism as a voltage value is read, and the transistor 14 that determines the solenoid current Ism is feedback-controlled such that the detection voltage Vsm becomes the target voltage Vtgt as desired status of the control object. Upon execution of feedback control, first, the feedback gain ΔT is set in accordance with the difference between the detection voltage Vsm and the target voltage Vtgt such that the greater the difference becomes, the greater the feedback gain ΔT becomes. Further, a detection voltage after a predetermined period is estimated based on the change of the detection voltage Vsm from the past, and it is determined whether or not the estimation value (estimation operation status recited in the claims) is in an overshoot status where the estimation value exceeds the target voltage Vtgt from the present detection voltage vsm. If it is determined that the estimation value is in the overshoot status, the feedback gain ΔT is varied to a small value by multiplying the feedback gain ΔT by the ratio B/C between the difference B between the present detection voltage Vsm and the target voltage Vtgt and the difference C between the present detection voltage Vsm and the estimation value.

Figure 8:
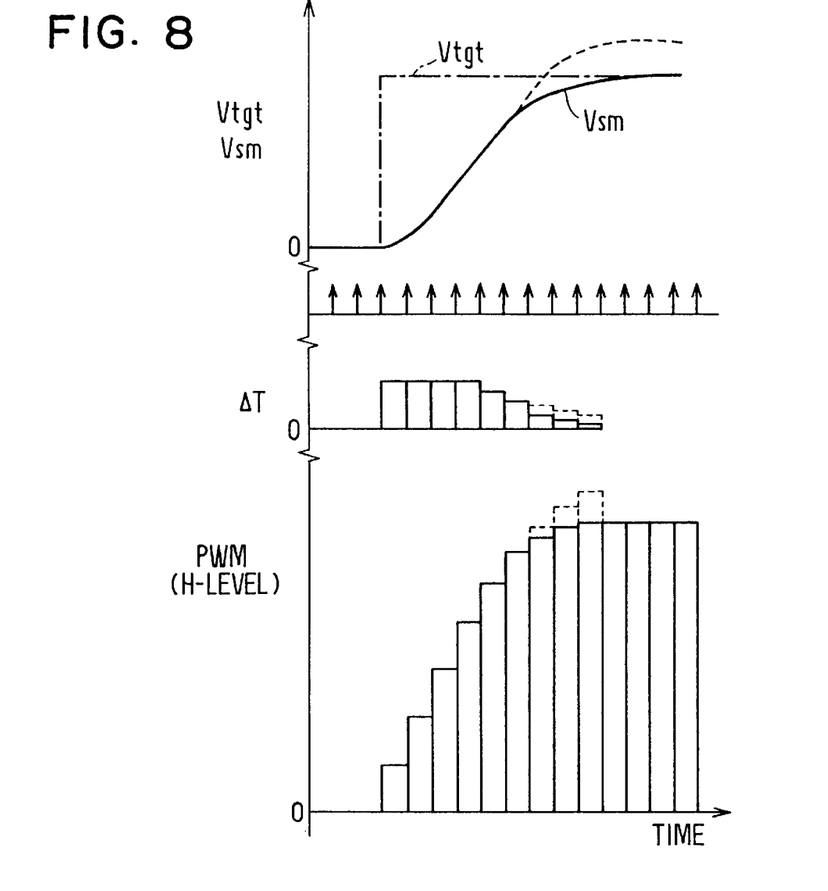
FIG. 8 is a time chart showing the operation and effect of the feedback control actually performed in the embodiment.

Accordingly, as shown in FIG. 8, overshoot can be more reliably prevented in comparison with a case where the feedback gain ΔT is simply set in accordance with the difference between the detection voltage Vsm and the target voltage Vtgt to prevent overshoot while maintaining the control response.

That is, in a case where the feedback gain ΔT is set in accordance with the difference between the detection voltage Vsm and the target voltage Vtgt, if the difference is large, the feedback gain ΔT is increased to quickly change the detection voltage Vsm toward the target voltage Vtgt, while if the difference is small, the feedback gain ΔT is reduced to slowly change the detection voltage Vsm toward the target voltage Vtgt. In this case, occurrence of overshoot can be suppressed to a certain degree in comparison with a case where the feedback gain ΔT is fixed. However, if the estimation of future detection voltage Vsm and determination of possibility of overshoot, as described in the present embodiment, are not performed, the feedback gain ΔT is too large when the detection voltage Vsm is closer to the target voltage Vtgt, further, the PWM signal (High level) output time as a control amount is long, and as a result, the detection voltage Vsm may overshoot the target voltage Vtgt, as indicated by a dotted line in FIG. 8.

However, in the present embodiment, the future detection voltage Vsm is estimated, and if it is determined that the estimation value in overshoot status, the feedback gain ΔT is varied to a small value in correspondence with the degree of overshoot of the estimation value (i.e., ratio B/C). By this arrangement, the occurrence of overshoot can be more excellently suppressed.

According to the present embodiment, the control response to quickly bring the detection voltage Vsm close to the target voltage Vtgt and the control stability to quickly converge the detection voltage to the target voltage Vtgt if the detection voltage Vsm is closer to the target voltage Vtgt, can be satisfied. Further, the line pressure of the automatic transmission can be quickly and highly precisely controlled to the target fluid pressure Ptgt.

Figure 9:
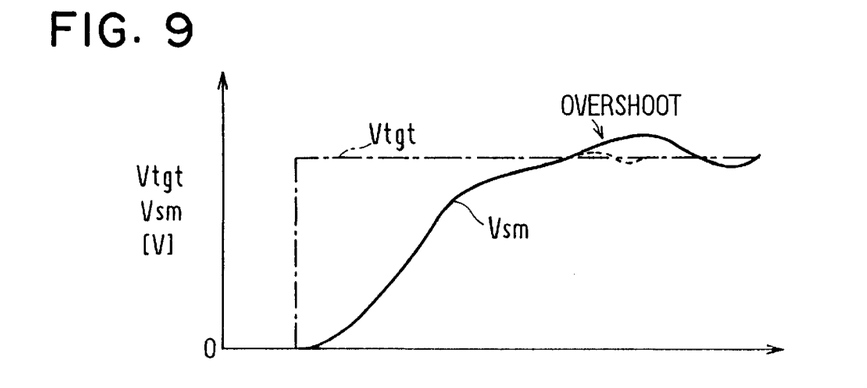
FIG. 9 is a time chart showing voltage change when the detection voltage enters overshoot status upon execution of the control processing in the embodiment.

As described above, in the present embodiment, the overshoot of the detection voltage Vsm from the target voltage Vtgt can be suppressed in an excellent fashion. However, the overshoot occurs due to the delay of feedback control such as detection delay from an actual detection value, and the delay changes due to various control conditions. Accordingly, even when the result of control is estimated and the feedback gain is varied as described above, overshoot cannot be completely prevented without difficulty, and overshoot may occur depending on the control conditions. Further, in a case where overshoot actually occurs, if the feedback gain ΔT is varied as described above, the control after the occurrence of overshoot is delayed as represented by a solid line in FIG. 9, and the convergence of the control may be degraded.

Figure 10:
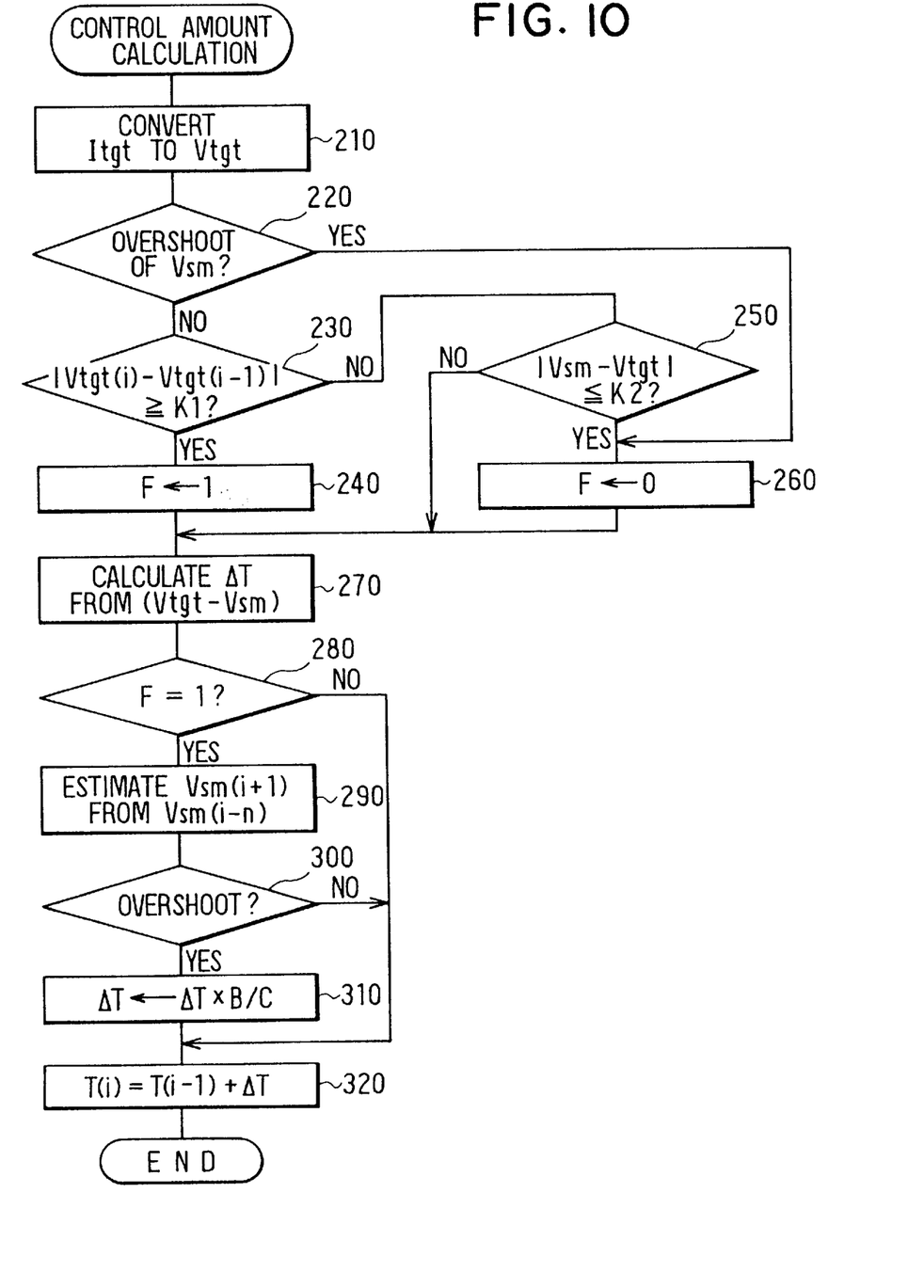
FIG. 10 is a flowchart showing a modification of the control amount calculation processing.

Accordingly, if this problem occurs, the control amount calculation processing shown in FIG. 4A may be performed as shown in FIG. 10.

That is, in the control amount calculation processing in FIG. 10, at step S210, the target voltage Vtgt is calculated from the target current Itgt (conversion of Itgt to Vtgt), and at step S220, it is determined whether or not the detection voltage Vsm has overshot the target voltage Vtgt. If it is determined that the detection voltage Vsm has overshot the target voltage, the process proceeds to step S260 at which an estimation permission flag F is reset (to a value "0") such that the processings performed for subsequent feedback gain correction (i.e., the estimation of future detection voltage, the determination of overshoot status of the estimation value and the feedback gain correction) are inhibited.

Further, if it is determined at step S220 that the detection voltage Vsm has not overshot the target voltage Vtgt, the process proceeds to step S230, at which it is determined whether or not the absolute value of the difference between the target voltage Vtgt(i) set at step S210 and the previously set target voltage Vtgt(i−1) is a predetermined value K1 or greater. If the difference is the predetermined value K1 or greater, as the target voltage Vtgt has greatly changed, feedback control must be newly started to control the detection voltage Vsm toward the target voltage Vtgt. The process proceeds to step S240 at which the estimation permission flag F is set to a value "1" to permit the processings performed for the subsequent feedback gain correction.

On the other hand, if it is determined at step S230 that the absolute value of the difference between the target voltage Vtgt(i) and the target voltage Vtgt(i−1) is less than the predetermined value K1, as the target voltage Vtgt has not greatly changed, i.e., the target voltage Vtgt is the same as the previously set target voltage or even if it has changed, they are substantially the same, the process proceeds to step S250. At step S250, it is determined whether or not the absolute value of the difference between the present detection voltage Vsm and the target voltage Vtgt is a predetermined value K2 or less. If it is determined that the absolute value of the difference between the detection voltage Vsm and the target voltage Vtgt is the predetermined value K2 or less and the detection voltage Vsm (i.e., the solenoid current Ism) is substantially controlled to the target voltage Vtgt (i.e., the target current Itgt), the process proceeds to step S260 to reset the estimation permission flag F.

If the estimation permission flag F is set or reset at step S240 or S260, or it is determined at step S250 that the absolute value of the difference between the detection voltage Vsm and the target voltage Vtgt is over the predetermined value K2, the process proceeds to step S270. At step S270, similarly to step S120 of the above embodiment, the feedback gain ΔT is calculated from the difference between the target voltage Vtgt and the detection voltage Vsm (Vtgt−Vsm).

Further, as the feedback gain ΔT is calculated at step S270, the process proceeds to step S280, at which it is determined whether or not the estimation permission flag F is set. If it is determined that the estimation permission flag F is set, the process proceeds to step S290. At step S290, similar to steps S130 to S150 of the above embodiment, the detection voltage Vsm(i+m) after a predetermined period is estimated based on the present detection voltage Vsm(i) and the past detection voltage Vsm(i−n), then it is determined at step S300 whether or not the estimation result overshoots the target voltage vtgt. If it is determined that the estimation result overshoots the target voltage, the process proceeds to step S310, at which the series of processings for feedback gain ΔT correction to change the feedback gain ΔT to a small value is performed. Thereafter, the process proceeds to step S320.

If it is determined at step S280 that the estimation permission flag F is reset, as the feedback gain ΔT correction is inhibited, the series of processings at steps S290 to S310 is not performed, and the process proceeds to step S320.

At step S320, similarly to step S160 of the above embodiment, the PWM signal output time T(i) is obtained by adding the feedback gain ΔT to the previously obtained PwM signal output time T(i−1). The obtained output time T(i) is stored as a control amount for line pressure control, and the process temporarily ends.

As described above, in the control amount calculation processing shown in FIG. 10, if the detection voltage Vsm has already overshot the target voltage Vtgt, the estimation permission flag F is reset so as to inhibit the feedback gain ΔT correction until the target voltage Vtgt changes to the predetermined value K1 or greater. Accordingly, as represented by a dotted line in FIG. 9, the time to converge the detection voltage Vsm to the target voltage Vtgt after the overshoot of detection voltage Vsm can be reduced. Thus, the control performance is improved.

Further, if the target voltage vtgt has changed to the predetermined value K1 or greater, the estimation permission flag F is set so as to remove the inhibition of the feedback gain ΔT correction. Accordingly, if the detection voltage Vsm must be greatly changed toward the target voltage Vtgt, the detection voltage Vsm can be quickly changed toward the target voltage Vtgt while the detection voltage Vsm is prevented from overshooting the target voltage Vtgt.

Further, in the control amount calculation processing shown in FIG. 10, if the target voltage Vtgt has not changed to the predetermined value K1 or greater, it is determined whether or not the absolute value of the difference between the target voltage Vtgt and the detection voltage Vsm is the predetermined value K2 or less (i.e., the detection voltage Vsm is substantially controlled to the target voltage Vtgt). Even if it is determined that the detection voltage Vsm is substantially controlled to the target voltage Vtgt, the estimation permission flag F is reset so as to inhibit the feedback gain ΔT correction until the target voltage Vtgt changes to a predetermined value or greater. This prevents the problem of the feedback gain ΔT being varied to a small value even though the detection voltage Vsm is controlled around the target voltage Vtgt and the convergence of control is lowered.

In the control amount calculation processing shown in FIG. 10, it is to be noted that the estimation is inhibited by a series of processings at steps S220 to S260 and the processing at step S280.

The embodiment has been described as a case where the present invention is applied to the method and apparatus that controls the solenoid 12 for line pressure control of the automatic transmission. However, the present invention is not limited to the above embodiment but applicable in various ways.

For example, in the above embodiment, to feedback-control the current amount (solenoid current) to flow through the solenoid 12 as the control object, the feedback gain ΔT, set in accordance with the difference between a target value and an actual value, is added to the PWM signal output time as a previous control amount, so as to update the control amount. However, even in use of an apparatus to calculate a control amount, if the present invention is applied to the apparatus, similar advantages to those in the above embodiment can be obtained by multiplying the control gain (feedback gain) by the difference between the target value and the actual value.

Further, in the above embodiment, the feedback gain ΔT is set in accordance with the difference between the target value and the actual value. However, even in use of an apparatus where the feedback gain ΔT is fixed to a predetermined value, if the present invention is applied to the apparatus, occurrence of overshoot can be prevented without lowering the control response, and the control stability can be improved.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus comprising:
   detection means for detecting an operation status of a control object;
   control amount calculation means for calculating a control amount to feedback-control the control object to a desired status based on a difference between an actual operation status of the control object detected by the detection means and the desired status and a control gain;
   estimation means for estimating an operation status of the control object which occurs after a predetermined period based on a change of the actual operation status detected by the detection means from the past to the present;
   determination means for determining whether an estimation operation status estimated by the estimation means is in an overshoot status such that the present actual operation status exceeds the desired status; and
   correction means for changing the control gain to a smaller value if the determination means determines that the estimation operation status is in the overshoot status;
   wherein the estimation means estimates the operation status which occurs after the predetermined period based on a difference between the present actual operation status and a previous actual operation status occurring a predetermined period ago, on an assumption that the operation status changes at a predetermined rate.

2. A control apparatus according to claim 1, wherein the correction means calculates a difference B between the present actual operation status and the desired status and a difference C between the present actual operation status and the estimated operation status respectively, and corrects the control gain by multiplying the control gain by a ratio B/C between the differences B and C.

3. A control apparatus according to claim 1, further comprising:
   setting means for setting the control gain based on the difference between the actual operation status of the control object detected by the detection means and the desired status, such that the larger the difference is, the larger the control gain is,
   wherein the control amount calculation means calculates the control amount by using the control gain set by the setting means, and the correction means further corrects the control gain set by the setting means and used by the control amount calculation means for calculating the control amount.

4. A control apparatus according to claim 1, further comprising:
   correction inhibition means for, if the actual operation status exceeds the desired status as a result of control on the control object, inhibiting correction of the control gain by the correction means until at least one of the cases where the desired status changes to be greater than a first predetermined value and the difference between the actual operation status and the desired status increases to be greater than a second predetermined value due to change of external load on the control object.

5. A control apparatus according to claim 4, wherein if it is determined that the difference between the actual operation status and the desired status is less than the second predetermined value as a result of control on the control object, the correction inhibition means inhibits the correction of the control gain by the correction means until the desired status changes to be greater than the first predetermined value or the difference between the actual operation status and the desired status increases to be greater than the second predetermined value.

6. A control apparatus according to claim 1, wherein the control object is an inductive load to control a conductive current amount by PWM control on a switching device provided on a conductive path, and the detection means detects the conductive current amount to the inductive load.

7. A control apparatus according to claim 6, wherein the control amount calculation means includes a smoothing means which smoothes the detection signal from the detection means, and the control amount calculation means calculates a control amount in order to PWM-control the switching device based on the difference between the detection signal value and the target value and the control gain, such that the value of the detection signal becomes a target value corresponding to a target current to flow through the inductive load.

8. A control apparatus according to claim 1, wherein the control object is a solenoid which is turned on and off for controlling operation of a vehicle automatic transmission.

9. A control apparatus according to claim 8, wherein the control amount calculation means includes a smoothing circuit which smoothes the detection signal from the detection means, and the control amount calculation means uses the smoothed detection signal.

10. A control apparatus according to claim 1, wherein said control object is a solenoid installed in a vehicle.

11. A control apparatus according to claim 10, wherein the solenoid is for controlling operation of an automatic transmission of the vehicle.

12. A control apparatus according to claim 1, wherein said control object is PWM-controlled.

13. A control apparatus according to claim 1, wherein the predetermined rate at which the operation status changes is a constant rate.

14. A control method for a control object comprising:

detecting a present actual operation status of a control object;

estimating a future operation status of the control object which occurs after a predetermined period based on a change in an actual operation status from the past to the present;

determining whether the estimated future operation status is in an overshoot status relative to a target operation status;

changing a control gain to a smaller value if the estimated future operation status is in the overshoot status; and calculating a control amount to feedback-control the control object to the target operation status based on a difference between the detected actual operation status and the target operation status and the changed control gains;

wherein the estimating step estimates the future operation status based on a difference between the present actual operation status and a previous actual operation status occurring a predetermined period ago.

15. A control method according to claim 14, wherein the changing step calculates a difference B between the present actual operation status and the target operation status and a difference C between the present actual operation status and the estimated operation status respectively, and changes the control gain by multiplying the control gain by a ratio B/C between the differences B and C.

16. A control method according to claim 14, wherein the control object is a solenoid for controlling a fluid pressure in a vehicle automatic transmission, and the detecting step detects an average electric current of the solenoid as the actual operation state by smoothing electric current actually flowing in the solenoid.

17. A control method according to claim 14, wherein said control object is a solenoid installed in a vehicle.

18. A control method according to claim 17, wherein the solenoid is for controlling operation of an automatic transmission of the vehicle.

19. A control method according to claim 14, wherein said control object is PWM-controlled.

* * * * *